US010676061B2

(12) United States Patent
Tanaka et al.

(10) Patent No.: US 10,676,061 B2
(45) Date of Patent: Jun. 9, 2020

(54) GAS GENERATOR

(71) Applicant: NIPPON KAYAKU KABUSHIKI KAISHA, Chiyoda-ku (JP)

(72) Inventors: Yusuke Tanaka, Himeji (JP); Hiroaki Koyama, Himeji (JP); Motohiro Kanaji, Himeji (JP); Shinya Hasegawa, Himeji (JP)

(73) Assignee: NIPPON KAYAKU KABUSHIKI KAISHA, Chiyoda-ku (JP)

(*) Notice: Subject to any disclaimer, the term of this patent is extended or adjusted under 35 U.S.C. 154(b) by 0 days.

(21) Appl. No.: 16/075,880

(22) PCT Filed: Feb. 9, 2017

(86) PCT No.: PCT/JP2017/004747
§ 371 (c)(1),
(2) Date: Aug. 6, 2018

(87) PCT Pub. No.: WO2017/138612
PCT Pub. Date: Aug. 17, 2017

(65) Prior Publication Data
US 2019/0054891 A1 Feb. 21, 2019

(30) Foreign Application Priority Data
Feb. 10, 2016 (JP) .................. 2016-023698

(51) Int. Cl.
*B60R 21/264* (2006.01)
*F42B 3/12* (2006.01)
*B60R 21/26* (2011.01)

(52) U.S. Cl.
CPC .............. *B60R 21/264* (2013.01); *F42B 3/12* (2013.01); *B60R 2021/26076* (2013.01)

(58) Field of Classification Search
CPC ................... F42B 3/12; B60R 21/264; B60R 2021/26076; B01J 7/00; C06D 5/00
(Continued)

(56) References Cited

U.S. PATENT DOCUMENTS 6,073,963 A * 6/2000 Hamilton ................ B60R 21/26
280/741
6,644,198 B1 * 11/2003 Avetisian ................ F42B 3/103
102/202.14
(Continued)

FOREIGN PATENT DOCUMENTS

JP 2001-165600 A 6/2001
JP 2010-173559 A 8/2010
(Continued)

OTHER PUBLICATIONS

International Search Report dated Apr. 11, 2017, in PCT/JP2017/004747 filed Feb. 9, 2017.

Primary Examiner — Stephen Johnson
Assistant Examiner — Benjamin S Gomberg
(74) Attorney, Agent, or Firm — Oblon, McClelland, Maier & Neustadt, L.L.P.

(57) ABSTRACT

A gas generator includes a cylindrical housing including a top plate portion and a bottom plate portion, an igniter including an ignition portion charged with an ignition agent, and a fixing portion which is formed from a resin molding and fixes the igniter to the bottom plate portion. The fixing portion includes an annular wall portion surrounding an outer circumferential surface of the ignition portion. The annular wall portion has a lower cover portion provided as being continuous in a circumferential direction on a side of the bottom plate portion so as to cover the outer circumferential surface of the ignition portion as being secured to the outer circumferential surface of the ignition portion and an (Continued)

upper enclosing portion provided on a side of the top plate portion at a distance from the outer circumferential surface of the ignition portion.

10 Claims, 8 Drawing Sheets

(58) Field of Classification Search
USPC .......................................................... 102/530
See application file for complete search history.

(56) References Cited

U.S. PATENT DOCUMENTS

| | | | |
|---|---|---|---|
| 6,718,884 B1 | 4/2004 | Yabuta et al. | |
| 6,820,556 B1* | 11/2004 | Oda | B60R 21/2644 102/202.14 |
| 7,540,241 B2* | 6/2009 | Bierwirth | B60R 21/2644 102/202.12 |
| 7,854,201 B2* | 12/2010 | Oda | F42B 3/195 102/202.12 |
| 9,139,156 B2* | 9/2015 | Bierwirth | B60R 21/2644 |
| 9,199,603 B2* | 12/2015 | Ohsugi | B60R 21/2644 |
| 9,879,952 B2* | 1/2018 | Schwuchow | B60R 21/26 |
| 2011/0101651 A1 | 5/2011 | Bierwirth et al. | |
| 2013/0068123 A1* | 3/2013 | Lefevre | F42B 3/103 102/530 |
| 2013/0276662 A1* | 10/2013 | Ohsugi | B60R 21/2644 102/530 |
| 2013/0276663 A1* | 10/2013 | Ohsugi | B60R 21/2644 102/530 |
| 2013/0276664 A1* | 10/2013 | Ohsugi | B60R 21/2644 102/530 |
| 2016/0052486 A1* | 2/2016 | Ohsugi | B60R 21/26 102/530 |

FOREIGN PATENT DOCUMENTS

| | | |
|---|---|---|
| JP | 2012-504073 A | 2/2012 |
| JP | 2015-157618 A | 9/2015 |
| WO | WO 2014/157648 A1 | 10/2014 |

* cited by examiner

GAS GENERATOR

TECHNICAL FIELD

The present invention relates to a gas generator incorporated in a passenger protection apparatus, and particularly to a gas generator incorporated in an air bag apparatus equipped in a car.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with an air bag serving as a cushion, as the air bag is expanded and developed instantaneously at the time of collision of the vehicle.

The gas generator is equipment which is incorporated in this air bag apparatus, an igniter therein being ignited in response to power feed through a control unit at the time of collision of a vehicle to thereby burn a gas generating agent with flame caused by the igniter and instantaneously generate a large amount of gas, and thus expands and develops an air bag.

Gas generators of various structures are available. A disc type gas generator of which outer geometry is in a substantially short columnar shape is available as a gas generator suitably used for an air bag apparatus on a driver's seat side, and a cylinder type gas generator of which outer geometry is in a substantially long columnar shape is available as a gas generator suitably used for a side air bag apparatus, a curtain air bag apparatus, an air bag apparatus on a passenger's seat side, and a knee air bag apparatus.

A structure in which an igniter is fixed to a housing through insert molding of a resin material as a source material may be adopted for a gas generator in recent years from a point of view of reduction in weight and facilitation of manufacturing. Specifically, for example, for a disc type gas generator, such a structure has been adopted that a cylindrical lower shell with bottom having an opening formed in a bottom plate portion is fabricated by press-working one plate-shaped member made of metal, an igniter is arranged to pass through the opening, and a resin molding is formed by feeding an insulating fluid resin material into a space between the igniter and the lower shell and solidifying the resin material, so that the igniter is fixed to the lower shell with the formed resin molding.

Documents disclosing such a structure include, for example, Japanese Patent Laying-Open No. 2001-165600 (PTD 1), Japanese Patent Laying-Open No. 2010-173559 (PTD 2), and Japanese National Patent Publication No. 2012-504073 (PTD 3).

In order to obtain high gas output in an early stage from start of activation in a gas generator, it is important to efficiently guide thermal particles (that is, flames) generated in the igniter to the gas generating agent (to an enhancer agent when the enhancer agent is arranged between the gas generating agent and the igniter). Therefore, by arranging some member to surround the substantially columnar ignition portion of the igniter charged with the ignition agent, a direction of travel of the thermal particles generated in the igniter may be narrowed so that directivity is provided to the thermal particles.

For example, the gas generator disclosed in PTDs 2 and 3 is constructed such that substantially the entire outer circumferential surface of the ignition portion is covered with a thick resin molding and the resin molding in this portion provides directivity to a direction of travel of thermal particles generated in the igniter.

CITATION LIST

Patent Document

PTD 1: Japanese Patent Laying-Open No. 2001-165600
PTD 2: Japanese Patent Laying-Open No. 2010-173559
PTD 3: Japanese National Patent Publication No. 2012-504073

SUMMARY OF INVENTION

Technical Problem

When substantially the entire outer circumferential surface of the ignition portion is covered with a thick resin molding as in the gas generator disclosed in PTDs 2 and 3, however, an impact produced at the time of activation of the igniter is directly applied to the resin molding and it is a concern that the impact may lead to generation of a crack in the resin molding itself or at an interface between the resin molding and a member to which the resin molding is secured. Depending on a condition of generation of the crack, the crack will become a cause of failure in operation of the gas generator.

For example, when the generated crack reaches the outside of the gas generator, a space in the housing and a space outside the housing communicate with each other in an unintended portion during operation of the gas generator and such a failure as an unintended burning state of the gas generating agent is induced.

In this connection, the gas generator disclosed in PTD 1 adopts such a construction that only a portion on a lower end side of an outer circumferential surface of an ignition portion is covered with the resin molding. Therefore, generation of a crack as described above can significantly be suppressed.

According to such a construction, however, the ignition portion is not covered with other members. Therefore, directivity is not provided to a direction of travel of thermal particles generated in the igniter and the thermal particles cannot efficiently be guided to the gas generating agent or the enhancer agent. Consequently, high gas output cannot be obtained in an early stage from start of activation.

Therefore, the present invention was made to solve the problems described above, and an object is to provide a gas generator capable of obtaining high gas output in an early stage from start of activation and preventing occurrence of a failure during operation.

Solution to Problem

A gas generator based on a first aspect of the present invention includes a housing, an igniter, and a fixing portion. The housing is formed of a cylindrical member constituted of a top plate portion and a bottom plate portion closing axial end portions and a circumferential wall portion provided with a gas discharge opening and contains a combustion chamber accommodating a gas generating agent. The igniter is charged with an ignition agent for burning the gas generating agent. The fixing portion fixes the igniter to the bottom plate portion. The bottom plate portion is provided with an opening. The igniter includes an ignition portion defining an ignition chamber accommodating the ignition agent and a terminal pin connected to the ignition portion for igniting the ignition agent and arranged to pass through the opening. The fixing portion is formed from a resin molding provided to close the opening and to fill a space between the igniter and the bottom plate portion. The resin molding includes an annular wall portion surrounding an outer circumferential surface of the ignition portion. The annular wall portion has a lower cover portion provided as being continuous in a circumferential direction on a side of the bottom plate portion so as to cover the outer circumferential surface of the ignition portion as being secured to the outer circumferential surface of the ignition portion and an upper enclosing portion provided on a side of the top plate portion at a distance from the outer circumferential surface of the ignition portion.

In the gas generator based on the first aspect of the present invention, the ignition portion may have a substantially cylindrical cup body having a closed upper end and an open lower end and a plug closing the lower end of the cup body and supporting the terminal pin. In that case, the cup body may include a contact portion located on the side of the bottom plate portion and being in contact with the plug and a non-contact portion located on the side of the top plate portion and facing the ignition chamber as not being in contact with the plug. In that case, preferably, the lower cover portion covers at least a part of the contact portion and the upper enclosing portion faces at least a part of the non-contact portion.

In the gas generator based on the first aspect of the present invention, the annular wall portion may further have an upper auxiliary cover portion provided as being continuous in the circumferential direction on the side of the top plate portion so as to be located in a gap provided between the outer circumferential surface of the ignition portion and the upper enclosing portion and so as to cover the outer circumferential surface of the ignition portion as being secured to the outer circumferential surface of the ignition portion.

In the gas generator based on the first aspect of the present invention, a gate mark may be provided in a surface of the upper enclosing portion.

A gas generator based on a second aspect of the present invention includes a housing, an igniter, and a fixing portion. The housing is formed of a cylindrical member constituted of a top plate portion and a bottom plate portion closing axial end portions and a circumferential wall portion provided with a gas discharge opening and contains a combustion chamber accommodating a gas generating agent. The igniter is charged with an ignition agent for burning the gas generating agent. The fixing portion fixes the igniter to the bottom plate portion. The bottom plate portion is provided with an opening. The igniter includes an ignition portion defining an ignition chamber accommodating the ignition agent and a terminal pin connected to the ignition portion for igniting the ignition agent and arranged to pass through the opening. The fixing portion is formed from a resin molding provided to close the opening and to fill a space between the igniter and the bottom plate portion. The resin molding includes an annular wall portion surrounding an outer circumferential surface of the ignition portion. The annular wall portion has a lower cover portion provided as being continuous in a circumferential direction on a side of the bottom plate portion so as to cover the outer circumferential surface of the ignition portion as being secured to the outer circumferential surface of the ignition portion and an upper cover portion provided as being intermittent in the circumferential direction on a side of the top plate portion so as to cover the outer circumferential surface of the ignition portion as being secured to the outer circumferential surface of the ignition portion.

In the gas generator based on the second aspect of the present invention, the ignition portion may have a substantially cylindrical cup body having a closed upper end and an open lower end and a plug closing the lower end of the cup body and supporting the terminal pin. In that case, the cup body may include a contact portion located on the side of the bottom plate portion and being in contact with the plug and a non-contact portion located on the side of the top plate portion and facing the ignition chamber as not being in contact with the plug. In that case, preferably, the lower cover portion covers at least a part of the contact portion and the upper cover portion covers at least a part of the non-contact portion.

In the gas generator based on the second aspect of the present invention, the annular wall portion may further have an upper auxiliary cover portion provided as being intermittent in the circumferential direction on the side of the top plate portion so as to be located between the upper cover portion divided in the circumferential direction and so as to cover the outer circumferential surface of the ignition portion as being secured to the outer circumferential surface of the ignition portion. In that case, preferably, the upper auxiliary cover portion is smaller in thickness in a radial direction than the upper cover portion.

In the gas generator based on the second aspect of the present invention, a gate mark may be provided in a surface of the upper cover portion.

The gas generator based on the first and second aspects of the present invention may further include an externally attached component externally attached to the annular wall portion. In that case, an inner circumferential surface of the externally attached component and an outer circumferential surface of the annular wall portion may be brought in press contact with each other.

In the gas generator based on the first and second aspects of the present invention, the externally attached component may be a cup-shaped member which accommodates an enhancer agent arranged to face the ignition portion.

Advantageous Effects of Invention

According to the present invention, a gas generator capable of obtaining high gas output in an early stage from start of activation and preventing occurrence of a failure during operation can be provided.

DESCRIPTION OF EMBODIMENTS

Figure 1:
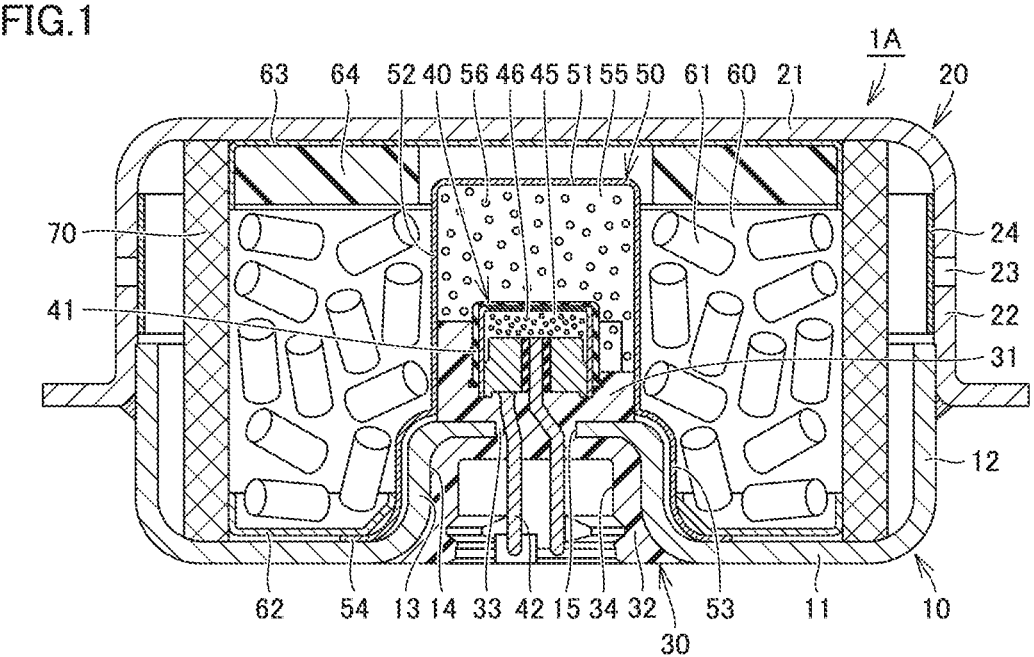
FIG. 1 is a schematic diagram of a gas generator in a first embodiment of the present invention.

An embodiment of the present invention will be described hereinafter in detail with reference to the drawings. An embodiment shown below represents application of the present invention to a disc type gas generator incorporated in an air bag apparatus equipped in a steering wheel or the like of a car. The same or common elements in embodiments shown below have the same reference characters allotted in the drawings and description thereof will not be repeated.

First Embodiment

Figure 2:
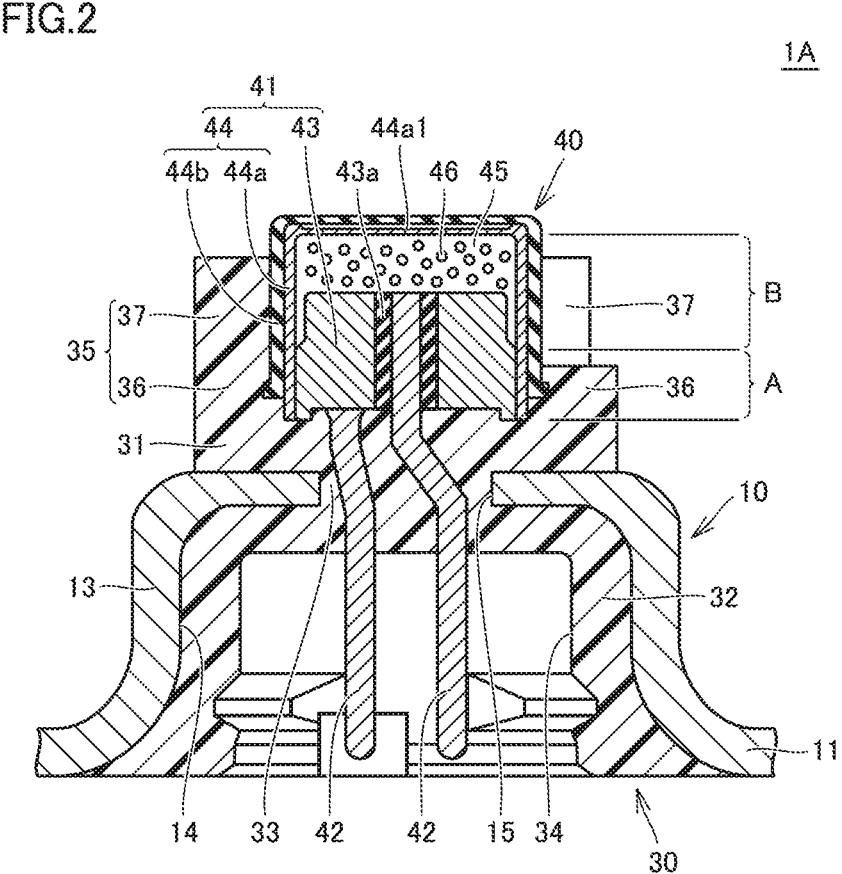
FIG. 2 is an enlarged schematic cross-sectional view showing a structure in the vicinity of an igniter of the gas generator shown in FIG. 1.
Figure 3:
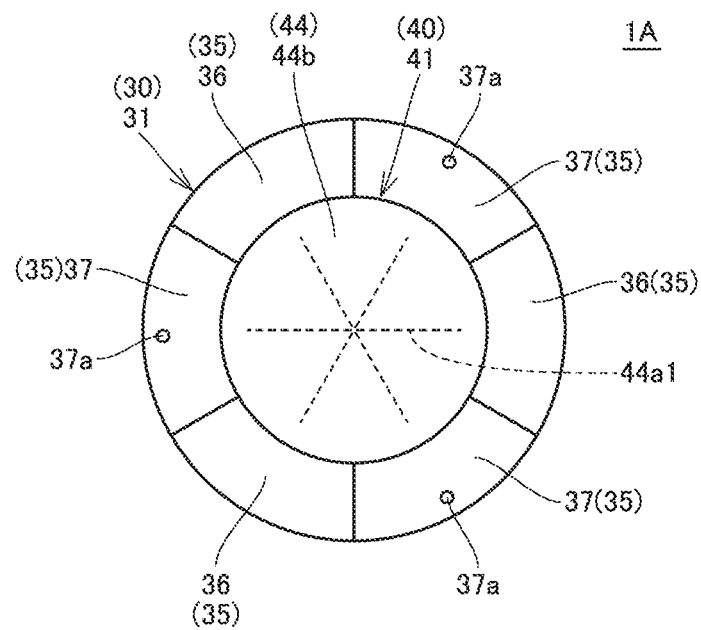
FIG. 3 is a schematic plan view showing the structure in the vicinity of the igniter of the gas generator shown in FIG. 1.

FIG. 1 is a schematic diagram of a gas generator in a first embodiment of the present invention. FIGS. 2 and 3 are an enlarged schematic cross-sectional view and a schematic plan view each showing a structure in the vicinity of an igniter of the gas generator shown in FIG. 1. A construction of a gas generator 1A in the present embodiment will initially be described with reference to FIGS. 1 to 3.

As shown in FIG. 1, gas generator 1A in the present embodiment has a short substantially cylindrical housing having one and the other axial ends closed, and is constructed to accommodate a fixing portion 30, an igniter 40, an enhancer cup 50, an enhancer agent 56, a gas generating agent 61, a lower supporting member 62, an upper supporting member 63, a cushion 64, a filter 70, and the like as internal components in an accommodation space provided in this housing. In the accommodation space provided in the housing, a combustion chamber 60 mainly accommodating gas generating agent 61 among the internal components described above is located.

The short substantially cylindrical housing includes a lower shell 10 and an upper shell 20. Each of lower shell 10 and upper shell 20 is made, for example, of a press-formed product formed by press-working a plate-shaped member made of a rolled metal. A metal plate composed, for example, of stainless steel, iron steel, an aluminum alloy, a stainless alloy, or the like is made use of as the plate-shaped member made of metal which forms lower shell 10 and upper shell 20, and what is called a high tensile steel plate which is free from such a failure as fracture even at the time of application of tensile stress not lower than 440 [MPa] and not higher than 780 [MPa] is suitably made use of.

Lower shell 10 and upper shell 20 are each formed in a substantially cylindrical shape with bottom, and the housing is constructed by combining and joining the shells such that open surfaces thereof face each other. Lower shell 10 has a bottom plate portion 11 and a circumferential wall portion 12 and upper shell 20 has a top plate portion 21 and a circumferential wall portion 22. One and the other axial end portions of the housing are thus closed by top plate portion 21 and bottom plate portion 11, respectively. Electron-beam welding, laser welding, friction welding, or the like is suitably made use of for joining lower shell 10 and upper shell 20 to each other.

As shown in FIGS. 1 and 2, a protruding cylindrical portion 13 protruding toward top plate portion 21 is provided in a central portion of bottom plate portion 11 of lower shell 10, so that a depression portion 14 is formed in the central portion of bottom plate portion 11 of lower shell 10. Protruding cylindrical portion 13 is a site to which igniter 40 is fixed with fixing portion 30 described above being interposed, and depression portion 14 is a site serving as a space for providing a female connector portion 34 in fixing portion 30.

Protruding cylindrical portion 13 is formed to be in a substantially cylindrical shape with bottom, and an opening 15 in a non-point-symmetrical shape (for example, in a D shape, a barrel shape, or an elliptical shape) when viewed two-dimensionally is provided at an axial end portion located on a side of top plate portion 21. Opening 15 is a site through which a pair of terminal pins 42 of igniter 40 passes.

Igniter 40 includes an ignition portion 41 and a pair of terminal pins 42 connected to ignition portion 41. Ignition portion 41 contains an ignition agent 46 producing flames by being ignited to burn at the time of activation and a not-shown resistor (a bridge wire) for igniting this ignition agent 46. The pair of terminal pins 42 is connected to ignition portion 41 for igniting ignition agent 46.

More specifically, as shown in FIG. 2, ignition portion 41 includes a squib cup 44 serving as a cup body formed from a substantially cylindrical member having a closed upper end and an open lower end and a plug 43 formed from a substantially disc-shaped member closing the lower end of squib cup 44, and ignition agent 46 and the resistor described above are accommodated in an ignition chamber 45 which is a space defined by squib cup 44 and plug 43.

Squib cup 44 has such a double-layered structure that an inner cup 44a made of metal and an outer cup 44b made of resin are layered on each other to form an upper wall and a sidewall of ignition chamber 45. Plug 43 is formed from a member made of metal and forms a lower wall of ignition chamber 45. A score 44a1 is provided in a portion forming an upper wall of inner cup 44a of squib cup 44.

Ignition portion 41 is formed as plug 43 is introduced in the opening provided at the lower end of squib cup 44. Therefore, the sidewall of squib cup 44 has a contact portion A in contact with plug 43 and a non-contact portion B facing ignition chamber 45 as not being in contact with plug 43. Here, contact portion A is located on a side of bottom plate portion 11 of the housing and non-contact portion B is located on a side of top plate portion 21 of the housing. Squib cup 44 and plug 43 are joined to each other, for example, with welding.

Plug 43 supports the pair of terminal pins 42. Specifically, a through hole is provided in a central portion of plug 43, one of the pair of terminal pins 42 is introduced to pass through the through hole so that an insulating joint portion 43a joins the terminal pin to plug 43, and the other of the pair of terminal pins 42 is joined to a prescribed position in a lower surface of plug 43 with welding. Glass or a resin represents a specific material for insulating joint portion 43a.

The resistor described above is attached to a tip end portion of one of the pair of terminal pins 42 which is located in ignition chamber 45, for coupling to plug 43, and ignition agent 46 is located to surround the resistor or to be proximate thereto.

Here, a Nichrome wire or a resistance wire made of an alloy containing platinum and tungsten is generally employed as a resistor, and ZPP (zirconium potassium perchlorate), ZWPP (zirconium tungsten potassium perchlorate), lead tricinate, or the like is generally made use of as an ignition agent.

Upon sensing collision, a prescribed amount of current flows in a resistor through terminal pin 42. As the prescribed amount of current flows in the resistor, Joule heat is generated in the resistor and ignition agent 46 starts burning. Flame at a high temperature caused by burning flows out as squib cup 44 accommodating ignition agent 46 bursts, with score 44a1 being the starting point. A time period from flow of a current in the resistor until activation of igniter 40 is generally not longer than 2 milliseconds in a case that the Nichrome wire is employed as the resistor.

As shown in FIGS. 1 and 2, igniter 40 is attached to bottom plate portion 11 in such a manner that terminal pin 42 is introduced from the inside of lower shell 10 to pass through opening 15 provided in protruding cylindrical portion 13. Specifically, fixing portion 30 formed from a resin material is provided around protruding cylindrical portion 13 provided in bottom plate portion 11, and igniter 40 is fixed to bottom plate portion 11 as being held by fixing portion 30.

Fixing portion 30 is formed from a resin molding provided to close opening 15 provided in bottom plate portion 11 of lower shell 10 and to fill a space between bottom plate portion 11 of lower shell 10 and igniter 40. More specifically, fixing portion 30 is formed through injection molding (more specifically, insert molding) with the use of a mold, and formed by attaching an insulating fluid resin material to bottom plate portion 11 so as to reach a part of an outer surface from a part of an inner surface of bottom plate portion 11 through opening 15 provided in bottom plate portion 11 and solidifying the fluid resin material.

Igniter 40 is fixed to bottom plate portion 11 with fixing portion 30 being interposed, in such a manner that terminal pin 42 is introduced from the inside of lower shell 10 to pass through opening 15 during molding of fixing portion 30 and the fluid resin material described above is fed to fill a space between igniter 40 and lower shell 10 in this state.

For a source material for fixing portion 30 formed by injection molding, a resin material excellent in heat resistance, durability, corrosion resistance, and the like after curing is suitably selected and made use of. In that case, without being limited to a thermosetting resin represented by an epoxy resin and the like, a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like can also be made use of. In a case where these thermoplastic resins are selected as a source material, in order to ensure mechanical strength of fixing portion 30 after molding, glass fibers or the like are preferably contained as fillers in these resin materials. In a case where sufficient mechanical strength can be ensured only by a thermoplastic resin, however, fillers as described above do not have to be added.

Fixing portion 30 has an inner fixing portion 31 covering a part of an inner surface of bottom plate portion 11 of lower shell 10, an outer fixing portion 32 covering a part of an outer surface of bottom plate portion 11 of lower shell 10, and a coupling portion 33 located within opening 15 provided in bottom plate portion 11 of lower shell 10 and continuing to each of inner fixing portion 31 and outer fixing portion 32.

Fixing portion 30 is secured to bottom plate portion 11 at a surface on a side of bottom plate portion 11, of each of inner fixing portion 31, outer fixing portion 32, and coupling portion 33. Fixing portion 30 is secured to a side surface and a lower surface of a portion of igniter 40 which is closer to a lower end of ignition portion 41 and a surface of a portion of igniter 40 which is closer to an upper end of terminal pin 42.

Thus, opening 15 is completely buried by terminal pin 42 and fixing portion 30, so that hermeticity of the space in the housing is ensured by sealability ensured in that portion. Since opening 15 is in a non-point-symmetrical shape in a plan view as described above, opening 15 and coupling portion 33 function also as a turning prevention mechanism which prevents fixing portion 30 from turning with respect to bottom plate portion 11 by burying opening 15 with coupling portion 33.

Here, as shown in FIGS. 2 and 3, inner fixing portion 31 includes an annular wall portion 35 surrounding an outer circumferential surface of squib cup 44 of ignition portion 41. Annular wall portion 35 includes a lower cover portion 36 located on a side of bottom plate portion 11 and an upper cover portion 37 located on a side of top plate portion 21. Details of these portions will be described later.

As shown in FIGS. 1 and 2, in a portion of outer fixing portion 32 of fixing portion 30, which faces the outside, female connector portion 34 is formed. This female connector portion 34 is a site for receiving a male connector (not shown) of a harness for connecting igniter 40 and a control unit (not shown) to each other, and it is located in depression portion 14 provided in bottom plate portion 11 of lower shell 10. In this female connector portion 34, a portion closer to the lower end of terminal pin 42 of igniter 40 is arranged as being exposed. The male connector is inserted in female connector portion 34, so that electrical conduction between a core wire of the harness and terminal pin 42 is established.

Injection molding described above may be carried out with the use of lower shell 10 obtained by providing an adhesive layer in advance at a prescribed position on a surface of bottom plate portion 11 in a portion to be covered with fixing portion 30. The adhesive layer can be formed by applying an adhesive in advance to a prescribed position of bottom plate portion 11 and curing the adhesive.

By doing so, the cured adhesive layer is located between bottom plate portion 11 and fixing portion 30, so that fixing portion 30 formed from a resin molding can more firmly be secured to bottom plate portion 11. Therefore, by providing the adhesive layer annularly along a circumferential direction so as to surround opening 15 provided in bottom plate portion 11, higher sealability can be ensured in that portion.

For the adhesive applied in advance to bottom plate portion 11, an adhesive containing as a source material, a resin material excellent in heat resistance, durability, corrosion resistance, and the like after curing is suitably made use of, and for example, an adhesive containing a cyanoacrylate-based resin or a silicone-based resin as a source material is particularly suitably made use of. An adhesive containing, other than the resin materials described above, a phenol-based resin, an epoxy-based resin, a melamine-based resin, a urea-based resin, a polyester-based resin, an alkyd-based resin, a polyurethane-based resin, a polyimide-based resin, a polyethylene-based resin, a polypropylene-based resin, a polyvinyl chloride-based resin, a polystyrene-based resin, a polyvinyl acetate-based resin, a polytetrafluoroethylene-based resin, an acrylonitrile butadiene styrene-based resin, an acrylonitrile styrene-based resin, an acrylic resin, a polyamide-based resin, a polyacetal-based resin, a polycarbonate-based resin, a polyphenylene ether-based resin, a polybutylene terephthalate-based resin, a polyethylene terephthalate-based resin, a polyolefin-based resin, a polyphenylene sulfide-based resin, a polysulfone-based resin, a polyether sulfone-based resin, a polyarylate-based resin, a polyether ether ketone-based resin, a polyamide imide-based resin, a liquid crystal polymer, styrene-based rubber, olefin-based rubber, and the like can be made use of as the adhesive described above.

As shown in FIG. 1, enhancer cup 50 as a cup-shaped member is assembled to bottom plate portion 11 so as to cover protruding cylindrical portion 13, fixing portion 30, and igniter 40. Enhancer cup 50 has a substantially cylindrical shape with bottom having an open end portion on the side of bottom plate portion 11, and contains an enhancer chamber 55 accommodating enhancer agent 56. Enhancer cup 50 is arranged to protrude toward combustion chamber 60 accommodating gas generating agent 61, such that enhancer chamber 55 provided therein faces ignition portion 41 of igniter 40.

Enhancer cup 50 has a top wall portion 51 and a sidewall portion 52 defining enhancer chamber 55 described above and an extension portion 53 extending radially outward from a portion of sidewall portion 52 on a side of an open end. Extension portion 53 is formed to extend along an inner surface of bottom plate portion 11 of lower shell 10. Specifically, extension portion 53 is curved in conformity with a shape of an inner bottom surface of bottom plate portion 11 in a portion where protruding cylindrical portion 13 is provided and in the vicinity thereof and includes a tip end portion 54 extending like a flange in a radially outer portion thereof.

Tip end portion 54 of extension portion 53 is arranged between bottom plate portion 11 and lower supporting member 62 along the axial direction of the housing and thus lies between bottom plate portion 11 and lower supporting member 62 along the axial direction of the housing. Since lower supporting member 62 is pressed against bottom plate portion 11 by gas generating agent 61, cushion 64, upper supporting member 63, and top plate portion 21 arranged thereabove, enhancer cup 50 is in such a state that tip end portion 54 of its extension portion 53 is pressed against bottom plate portion 11 by lower supporting member 62 and fixed to bottom plate portion 11.

A lower end of sidewall portion 52 of enhancer cup 50 is lightly press-fitted to inner fixing portion 31 including annular wall portion 35 of fixing portion 30. An inner circumferential surface of sidewall portion 52 of enhancer cup 50 and an outer circumferential surface of inner fixing portion 31 including annular wall portion 35 of fixing portion 30 are thus in press contact with each other. Enhancer cup 50 corresponds to an externally attached component externally attached to inner fixing portion 31 including annular wall portion 35 and is in frictional engagement with inner fixing portion 31.

Enhancer cup 50 accommodating enhancer agent 56 is assembled to a subassembly including lower shell 10 as being inverted so as not to spill enhancer agent 56. Thereafter, enhancer cup 50 is further inverted in order to assemble gas generating agent 61 or filter 70 to the subassembly. The mechanism above serves not to allow enhancer cup 50 assembled to the subassembly to come off from the subassembly.

Enhancer cup 50 has an opening in neither of top wall portion 51 and sidewall portion 52 and surrounds enhancer chamber 55 provided therein. This enhancer cup 50 bursts or melts with increase in pressure in enhancer chamber 55 or conduction of heat generated therein when enhancer agent 56 is ignited as a result of activation of igniter 40, and mechanical strength thereof is relatively low.

Therefore, a member made of metal such as aluminum or an aluminum alloy or a member made of resin such as a thermosetting resin represented by an epoxy resin and the like and a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like is suitably made use of for enhancer cup 50.

In addition to the above, a component formed from a member made of metal high in mechanical strength as represented by iron or copper, having an opening in sidewall portion 52 thereof, and having a sealing tape adhered to close the opening can also be made use of for enhancer cup 50.

Enhancer agent 56 charged into enhancer chamber 55 generates thermal particles as it is ignited to burn by flames produced as a result of activation of igniter 40. Enhancer agent 56 should be able to reliably start burning gas generating agent 61, and generally, a composition composed of metal powders/oxidizing agent represented by B/KNO$_3$, B/NaNO$_3$, or Sr(NO$_3$)$_2$, a composition composed of titanium hydride/potassium perchlorate, or a composition composed of B/5-aminotetrazole/potassium nitrate/molybdenum trioxide is employed. For enhancer agent 56, a powdery enhancer agent, an enhancer agent formed in a prescribed shape by a binder, or the like is made use of. A shape of enhancer agent 56 formed by a binder includes, for example, various shapes such as a granule, a column, a sheet, a sphere, a cylinder with a single hole, a cylinder with multiple holes, a tablet, and the like.

In a space surrounding a portion where enhancer cup 50 described above is arranged in a space inside the housing, combustion chamber 60 accommodating gas generating agent 61 is located. Specifically, as described above, enhancer cup 50 is arranged to protrude into combustion chamber 60 formed in the housing, and a space provided in a portion of this enhancer cup 50 facing the outer surface of sidewall portion 52 and a space provided in a portion thereof facing an outer surface of top wall portion 51 are provided as combustion chamber 60.

In a space surrounding combustion chamber 60 accommodating gas generating agent 61 in a radial direction of the housing, filter 70 is arranged along an inner circumference of the housing. Filter 70 has a cylindrical shape and is arranged such that a central axis thereof substantially matches with the axial direction of the housing.

Gas generating agent 61 is an agent which is ignited by thermal particles generated as a result of activation of igniter 40 and produces a gas as it burns. A non-azide-based gas generating agent is preferably employed as gas generating agent 61, and gas generating agent 61 is formed as a molding generally containing a fuel, an oxidizing agent, and an additive. For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of. In addition, as the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of. Moreover, as the additive, a binder, a slag formation agent, a combustion modifier, or the like is exemplified. As the binder, for example, metal salt of carboxymethyl cellulose, an organic binder such as stearate, or an inorganic binder such as synthetic hydrotalcite and Japanese acid clay can suitably be made use of. As the slag formation agent, silicon nitride, silica, Japanese acid clay, or the like can suitably be made use of. In addition, as the combustion modifier, a metal oxide, ferrosilicon, activated carbon, graphite, or the like can suitably be made use of.

A shape of a molding of gas generating agent 61 includes various shapes such as a particulate shape including a granule, a pellet, and a column, and a disc shape. In addition, among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which gas generator 1A is incorporated, and for example, a shape optimal for the specifications is preferably selected by selecting a shape allowing change over time of a rate of generation of a gas during burning of gas generating agent 61. Furthermore, in addition to a shape of gas generating agent 61, a size of a molding or an amount thereof for filling is preferably selected as appropriate, in consideration of a linear burning velocity, a pressure exponent, or the like of gas generating agent 61.

For example, a filter obtained by winding and sintering a metal wire rod of stainless steel or iron steel, a filter formed by press-working a mesh material into which metal wire rods are knitted to thereby pack the same, a filter obtained by winding a perforated metal plate, or the like is made use of as filter 70. Here, as the mesh material, specifically, a wire gauze of stocking stitch, a plain-woven wire gauze, an aggregate of crimped metal wire rods, or the like is made use of. In addition, as the perforated metal plate, for example, expanded metal obtained by making staggered cuts in a metal plate and forming holes by widening the cuts to thereby work the metal plate in a mesh, hook metal obtained by perforating a metal plate and collapsing burrs caused around a periphery of the hole for flattening, or the like is made use of. In this case, a size or a shape of a hole to be formed can be changed as appropriate as required, and holes different in size or shape may be included in the same metal plate. It is noted that, for example, a steel plate (mild steel) or a stainless steel plate can suitably be made use of as a metal plate, and a nonferrous metal plate of aluminum, copper, titanium, nickel, or an alloy thereof, or the like can also be made use of.

Filter 70 functions as cooling means for cooling a gas by depriving heat at a high temperature of the gas when the gas produced in combustion chamber 60 passes through this filter 70 and also functions as removal means for removing residues (slag) or the like contained in the gas. Therefore, in order to sufficiently cool the gas and to prevent emission of residues to the outside, the gas generated in combustion chamber 60 should reliably pass through filter 70.

In the vicinity of the end portion of combustion chamber 60 located on the side of bottom plate portion 11, lower supporting member 62 is arranged. Lower supporting member 62 has a cylindrical shape with bottom, which is provided with an opening in a bottom portion, and is arranged as substantially being applied to filter 70 and bottom plate portion 11 so as to cover a boundary portion between filter 70 and bottom plate portion 11. Thus, lower supporting member 62 is located between bottom plate portion 11 and gas generating agent 61 in the vicinity of the end portion of combustion chamber 60.

Lower supporting member 62 is flow-out prevention means for preventing a gas generated in combustion chamber 60 at the time of activation from flowing out through a gap between the lower end of filter 70 and bottom plate portion 11 without passing through filter 70. Lower supporting member 62 is formed, for example, by press-working a plate-shaped member made of metal, and suitably made of a member formed from a steel plate of common steel, special steel, or the like (such as a cold rolled steel plate or a stainless steel plate).

Upper supporting member 63 is arranged at the end portion of combustion chamber 60 located on the side of top plate portion 21. Upper supporting member 63 has a cylindrical shape with bottom, and is arranged as being applied to filter 70 and top plate portion 21 so as to cover a boundary portion between filter 70 and top plate portion 21. Thus, upper supporting member 63 is located between top plate portion 21 and gas generating agent 61 in the vicinity of the end portion of combustion chamber 60.

Upper supporting member 63 is flow-out prevention means for preventing a gas generated in combustion chamber 60 at the time of activation from flowing out through a gap between the upper end of filter 70 and top plate portion 21 without passing through filter 70. Similarly to lower supporting member 62, upper supporting member 63 is formed, for example, by press-working a plate-shaped member made of metal, and suitably made of a member formed from a steel plate of common steel, special steel, or the like (such as a cold rolled steel plate or a stainless steel plate).

In this upper supporting member 63, an annular cushion 64 is arranged to be in contact with gas generating agent 61 accommodated in combustion chamber 60. Cushion 64 is thus located between top plate portion 21 and gas generating agent 61 in a portion of combustion chamber 60 on the side of top plate portion 21 and presses gas generating agent 61 toward bottom plate portion 11.

This cushion 64 is provided for the purpose of preventing gas generating agent 61 made of a molding from being crushed by vibration or the like, and made of a member suitably formed of a molding of ceramic fibers, rock wool, a foamed resin (such as foamed silicone, foamed polypropylene, or foamed polyethylene), or rubber represented by chloroprene and EPDM.

A plurality of gas discharge openings 23 are provided in circumferential wall portion 22 of upper shell 20 in a portion facing filter 70. The plurality of gas discharge openings 23 serve for guiding a gas which has passed through filter 70 to the outside of the housing.

To an inner circumferential surface of circumferential wall portion 22 of upper shell 20, a sealing tape 24 made of a metal is attached to close the plurality of gas discharge openings 23. An aluminum foil or the like having a tacky member applied to its one surface can be made use of as this sealing tape 24 and hermeticity of combustion chamber 60 is ensured by sealing tape 24.

An operation of gas generator 1A in the present embodiment described above will now be described with reference to FIG. 1.

When a vehicle on which gas generator 1A in the present embodiment is mounted collides, collision sensing means separately provided in the vehicle senses collision, and based thereon, igniter 40 is activated in response to power feed through a control unit separately provided in the vehicle. As a result of activation of igniter 40, ignition agent 46 accommodated in ignition portion 41 is ignited and accordingly squib cup 44 covering ignition portion 41 bursts.

Enhancer agent 56 accommodated in enhancer chamber 55 is ignited to burn by flames produced as a result of activation of igniter 40, to thereby generate a large amount of thermal particles. Burning of this enhancer agent 56 bursts or melts enhancer cup 50 and the thermal particles described above flow into combustion chamber 60.

The thermal particles which have flowed in ignite and burn gas generating agent 61 accommodated in combustion chamber 60 and a large amount of gas is produced. The gas produced in combustion chamber 60 passes through filter 70. At that time, heat is deprived of the gas through filter 70 and the gas is cooled, slag contained in the gas is removed by filter 70, and the gas flows into an outer peripheral portion of the housing.

As an internal pressure in the housing increases, sealing by sealing tape 24 which has closed gas discharge opening 23 of upper shell 20 is broken, and the gas is discharged to the outside of the housing through gas discharge opening 23. The discharged gas is introduced in the air bag provided adjacent to gas generator 1A and it expands and develops the air bag. The operation of gas generator 1A is completed as above.

A construction in the vicinity of igniter 40 of gas generator 1A in the present embodiment will now be described in detail particularly with reference to FIGS. 2 and 3.

Referring to FIGS. 2 and 3, as described above, in gas generator 1A in the present embodiment, inner fixing portion 31 of fixing portion 30 formed from a resin molding includes annular wall portion 35 surrounding the outer circumferential surface of squib cup 44 of ignition portion 41 and annular wall portion 35 has lower cover portion 36 located on the side of bottom plate portion 11 and upper cover portion 37 located on the side of top plate portion 21.

Lower cover portion 36 is provided as being continuous in the circumferential direction on the side of bottom plate portion 11 so as to cover the outer circumferential surface of squib cup 44 of ignition portion 41 as being secured thereto. Lower cover portion 36 is in a form of an annular plate without discontinuity along the circumferential direction. A portion of the outer circumferential surface of squib cup 44 on the side of bottom plate portion 11 is thus completely covered with lower cover portion 36.

Upper cover portion 37 is provided as being intermittent in the circumferential direction on the side of top plate portion 21 so as to cover the outer circumferential surface of squib cup 44 of ignition portion 41 as being secured thereto. Upper cover portion 37 is in a form of a substantially annular plate partly discontinuous along the circumferential direction. A portion of the outer circumferential surface of squib cup 44 on the side of top plate portion 21 is thus partially covered with upper cover portion 37 but the remainder thereof is exposed. An upper surface of lower cover portion 36 located in a discontinuous portion of upper cover portion 37 in the circumferential direction is constructed to substantially be planar.

Lower cover portion 36 is provided to cover a part of contact portion A of squib cup 44 and upper cover portion 37 is provided to cover a part of non-contact portion B of squib cup 44. Since a boundary between contact portion A and non-contact portion B is arranged on the side of top plate portion 21 relative to a boundary between lower cover portion 36 and upper cover portion 37 in the present embodiment, the entire lower cover portion 36 is provided to cover contact portion A, a portion of upper cover portion 37 on the side of bottom plate portion 11 is provided to cover contact portion A, and a portion of upper cover portion 37 on the side of top plate portion 21 is provided to partially cover non-contact portion B.

According to such a construction, generation of an unintended crack leading to a failure in operation of gas generator 1A at fixing portion 30 itself formed from a resin molding or at the interface between fixing portion 30, and lower shell 10 and igniter 40 (in particular, igniter 40) which are members to which the fixing portion is secured, due to an impact generated as a result of activation of igniter 40 during operation of gas generator 1A can be prevented and directivity can be provided to a direction of travel of thermal particles generated in igniter 40. The reason will be described below in detail.

Figure 4:
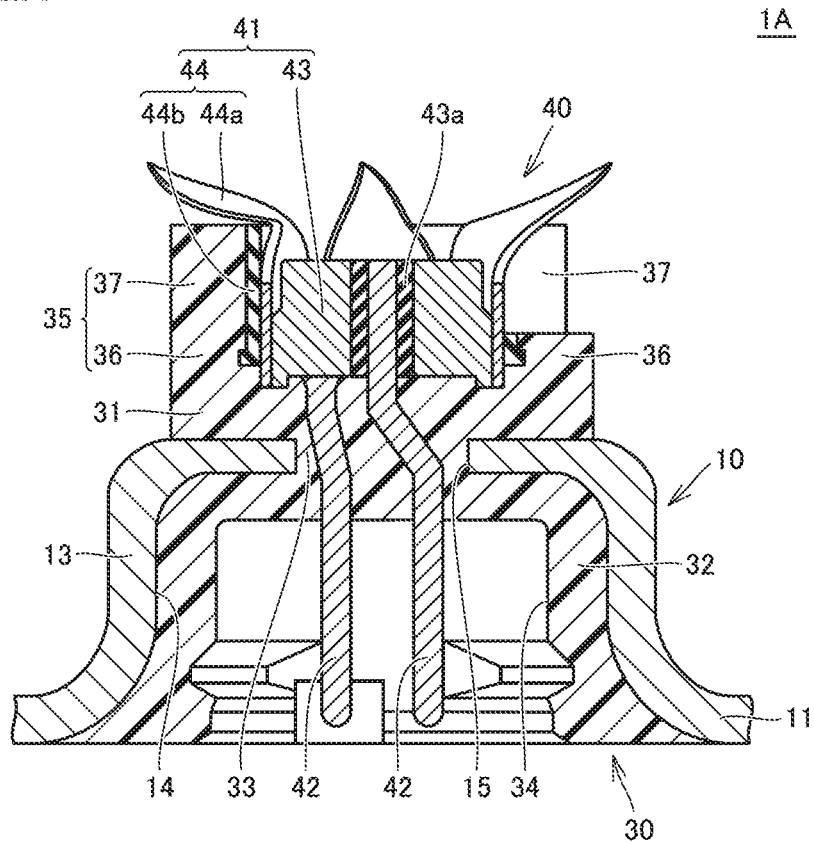
FIG. 4 is a schematic cross-sectional view showing a state in the vicinity of the igniter after operation of the gas generator shown in FIG. 1.

FIG. 4 is a schematic cross-sectional view showing a state in the vicinity of the igniter after operation of the gas generator shown in FIG. 1. As described above, when igniter 40 is activated, squib cup 44 bursts from score 44a1 which is a starting point as ignition agent 46 starts burning. Here, since a pressure in ignition chamber 45 has significantly increased, a portion of burst of squib cup 44 widely opens radially outward, and consequently a state after operation of gas generator 1A is as shown in FIG. 4.

Here, since the portion of burst of squib cup 44 deforms as it receives a pressure in ignition chamber 45 described above, a base of deformation is in the vicinity of a boundary between contact portion A and non-contact portion B of squib cup 44. Therefore, squib cup 44 receives a strong impact in its non-contact portion B.

As described above, non-contact portion B of squib cup 44 is partially covered with upper cover portion 37 of annular wall portion 35 of fixing portion 30 which is provided as being intermittent in the circumferential direction. Therefore, the impact applied to non-contact portion B is applied also to upper cover portion 37. Upper cover portion 37, however, is discontinuous along the circumferential direction. Therefore, individual upper cover portions 37 in a divided state can elastically deform so that the impact can be absorbed.

Therefore, by adopting the construction, the impact produced at the time of activation of igniter 40 can be absorbed by elastic deformation of individual upper cover portions 37 in the divided state. Therefore, no large crack is generated in fixing portion 30 including upper cover portion 37. If the upper cover portion is made of a thick wall continuous in the circumferential direction, the upper cover portion can hardly elastically deform. Therefore, the impact produced at the time of activation of the igniter cannot sufficiently be absorbed and the possibility of generation of a large crack in the fixing portion including the upper cover portion becomes higher.

By adopting the construction, the outer circumferential surface of squib cup 44 is covered with upper cover portions 37 in the divided state. Therefore, the portion of burst of squib cup 44 can be prevented from widely opening radially outward and a direction of travel of thermal particles generated in igniter 40 can be narrowed to a direction toward top plate portion 21. Directivity can thus be provided to the direction of travel of the thermal particles generated in igniter 40.

As set forth above, with gas generator 1A in the present embodiment, directivity can be provided to the direction of travel of the thermal particles generated in igniter 40. Therefore, high gas output can be obtained in an early stage from start of activation and no large crack is generated in fixing portion 30. Occurrence of a failure at the time of operation can thus be prevented.

Gas generator 1A in the present embodiment is constructed such that lower cover portion 36 of annular wall portion 35 is substantially similar in outer diameter to upper cover portion 37 and inner fixing portion 31 except for annular wall portion 35 is substantially similar in outer diameter to lower cover portion 36 and upper cover portion 37. The outer circumferential surface of inner fixing portion 31 including annular wall portion 35 is thus provided as a substantially annular circumferential surface.

According to such a construction, a press-fit margin for enhancer cup 50 to be press-fitted to inner fixing portion 31 can be longer along the axial direction of enhancer cup 50 by a dimension of upper cover portion 37 than in an example without upper cover portion 37. Therefore, strength of assembly of enhancer cup 50 to inner fixing portion 31 can be enhanced. Enhancer cup 50 can thus also effectively be prevented from coming off after enhancer cup 50 is assembled to the subassembly including lower shell 10 and until enhancer cup 50 is further fixed to lower shell 10 (for example, enhancer cup 50 being prevented from coming off when an operation to invert a workpiece described above is performed or when the entire workpiece is tilted during transfer between processes).

In order to more readily and reliably press-fit enhancer cup 50 described above, an outer geometry of a portion of inner fixing portion 31 including annular wall portion 35 to which enhancer cup 50 is to be press-fitted is preferably in a tapered shape slightly tapered toward top plate portion 21. In that case, the outer circumferential surface of inner fixing portion 31 including annular wall portion 35 described above is provided as a conical surface in a strict sense.

From a point of view of increase in strength of assembly of enhancer cup 50 to inner fixing portion 31, a press-fit margin is preferably secured such that the inner circumferential surface of sidewall portion 52 of enhancer cup 50 is brought in press contact not only with the outer circumferential surface of upper cover portion 37 and the outer circumferential surface of lower cover portion 36 but also with at least a part of the outer circumferential surface of inner fixing portion 31 in a portion located on the side of bottom plate portion 11 relative to lower cover portion 36.

Figure 5:
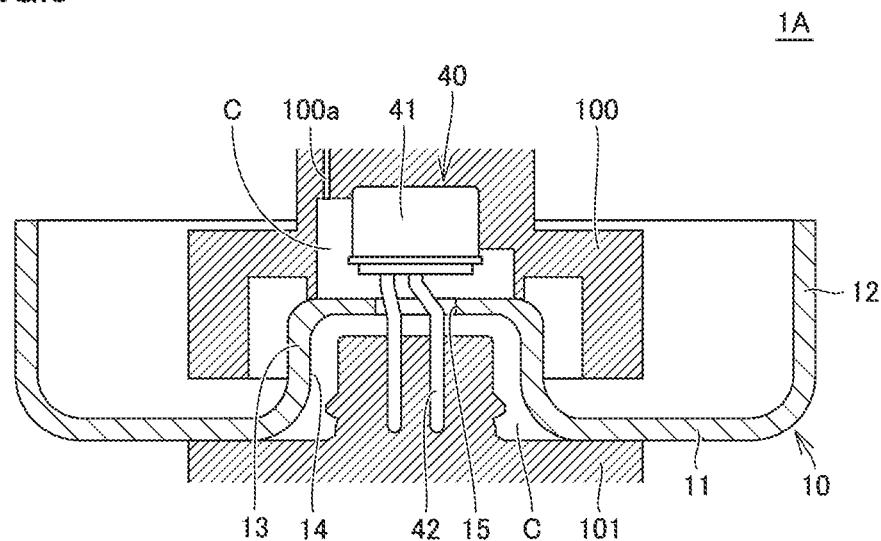
FIG. 5 is a schematic cross-sectional view showing a procedure of manufacturing a fixing portion of the gas generator shown in FIG. 1.

FIG. 5 is a schematic cross-sectional view showing a procedure of manufacturing the fixing portion of the gas generator shown in FIG. 1. As described above, fixing portion 30 is formed from a resin molding formed through injection molding (more specifically, insert molding) with the use of a mold, and in formation of fixing portion 30, an upper mold 100 and a lower mold 101 for injection molding as shown in FIG. 5 are made use of.

Specifically, initially, upper mold 100 and lower mold 101 are set for lower shell 10 manufactured by press-forming in advance. Lower mold 101 is set prior to setting of upper mold 100, and igniter 40 manufactured in advance is set on lower mold 101 from the inside of lower shell 10 such that terminal pin 42 is inserted into opening 15 provided in protruding cylindrical portion 13 of lower shell 10. A cavity C in a shape corresponding to fixing portion 30 is thus provided in upper mold 100 and lower mold 101.

In this state, a fluid resin material is fed into cavity C through a gate 100a for injection of the fluid resin material provided in upper mold 100 and thereafter the fed fluid resin material is solidified so that fixing portion 30 is formed. A space between bottom plate portion 11 of lower shell 10 and igniter 40 is thus filled with fixing portion 30 so that igniter 40 is fixed to lower shell 10. After fixing portion 30 is formed, upper mold 100 and lower mold 101 are removed.

As illustrated, gate 100a is preferably arranged in a surface of upper cover portion 37 provided in annular wall portion 35 of fixing portion 30 (more preferably, the upper surface located on the side of top plate portion 21 of each of upper cover portions 37 in the divided state after assembly). According to such a construction, as shown in FIG. 3, a gate mark 37a is provided in the surface of each of upper cover portions 37 in the divided state.

According to such a construction, generation of a crack in fixing portion 30 at the time of activation of igniter 40 can further effectively be prevented. This is because, in injection molding, a portion of contact in the inside of cavity C, of the fluid resin material simultaneously fed through a plurality of gates 100a is located in lower cover portion 36 corresponding to a portion between adjacent upper cover portions 37 and the contact portion is not located in each of upper cover portions 37 in the divided state.

The contact portion is a portion where strength is more likely to be lower than other portions. Therefore, when such a contact portion is located in upper cover portion 37 which receives a strong impact at the time of activation of igniter 40, a crack is more likely in upper cover portion 37. By adopting the construction, however, the contact portion is located in lower cover portion 36 which receives only a relatively weak impact at the time of activation of igniter 40. Therefore, a crack can effectively be prevented from being generated in annular wall portion 35 as a whole including lower cover portion 36 and upper cover portion 37.

First Modification

Figure 6:
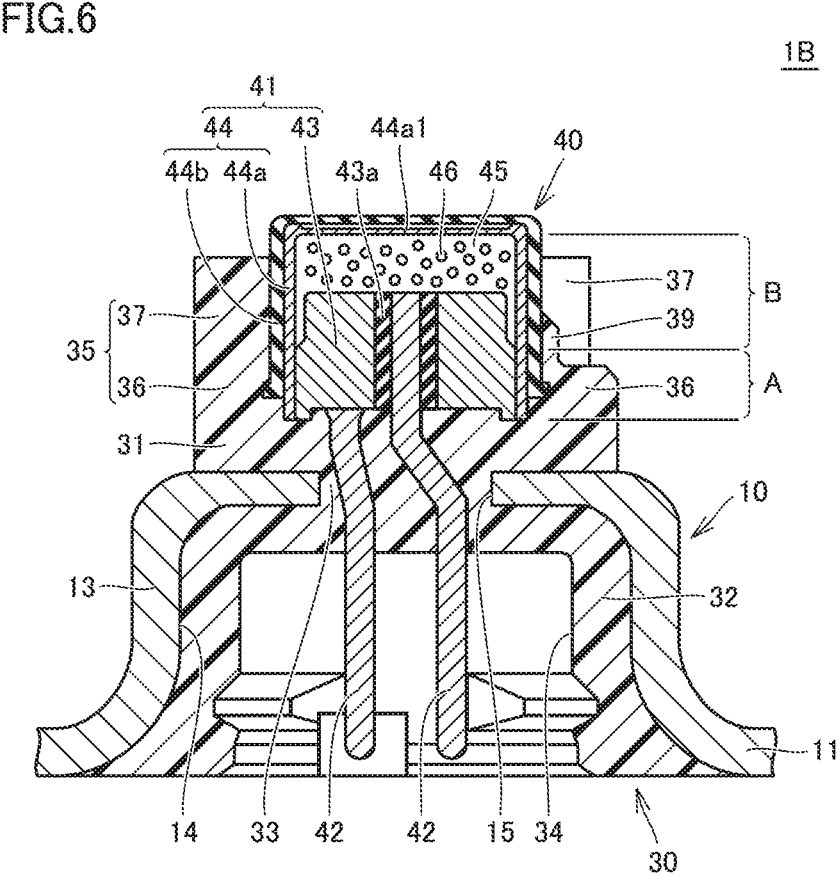
FIG. 6 is an enlarged schematic cross-sectional view showing a structure in the vicinity of the igniter of a gas generator according to a first modification.
Figure 7:
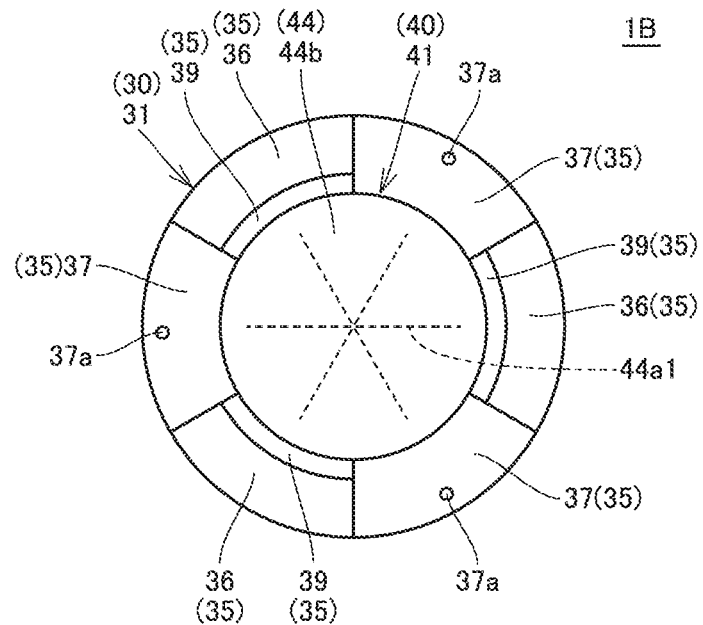
FIG. 7 is a schematic plan view showing the structure in the vicinity of the igniter of the gas generator according to the first modification.

FIGS. 6 and 7 are an enlarged schematic cross-sectional view and a schematic plan view each showing a structure in the vicinity of the igniter of a gas generator according to a first modification based on the present embodiment described above. A gas generator 1B according to the first modification will be described below with reference to FIGS. 6 and 7.

As shown in FIGS. 6 and 7, gas generator 1B according to the first modification is different from gas generator 1A described above in that annular wall portion 35 provided in fixing portion 30 further includes an upper auxiliary cover portion 39 in addition to lower cover portion 36 and upper cover portion 37.

Specifically, upper auxiliary cover portion 39 is provided between upper cover portions 37 divided in the circumferential direction. Upper auxiliary cover portion 39 is shorter in axial length than upper cover portion 37 and upper auxiliary cover portion 39 is smaller in thickness in the radial direction than upper cover portion 37. Upper auxiliary cover portion 39 is provided to cover a part of non-contact portion B of squib cup 44. The upper surface of lower cover portion 36 located in a discontinuous portion of upper cover portion 37 in the circumferential direction is constructed to substantially be planar.

Similarly to upper cover portion 37, upper auxiliary cover portion 39 is a site provided to receive and absorb an impact produced as a result of activation of igniter 40 at the time of operation of gas generator 1B, however, it is sufficiently small in thickness. Therefore, even when upper auxiliary cover portion 39 is provided, susceptibility to elastic deformation of each of upper cover portions 37 divided in the circumferential direction is not significantly impaired.

Therefore, according to such a construction as well, an effect the same as in gas generator 1A described above is obtained. High gas output can be obtained in an early stage from start of activation and occurrence of a failure at the time of operation can be prevented.

Second Embodiment

Figure 8:
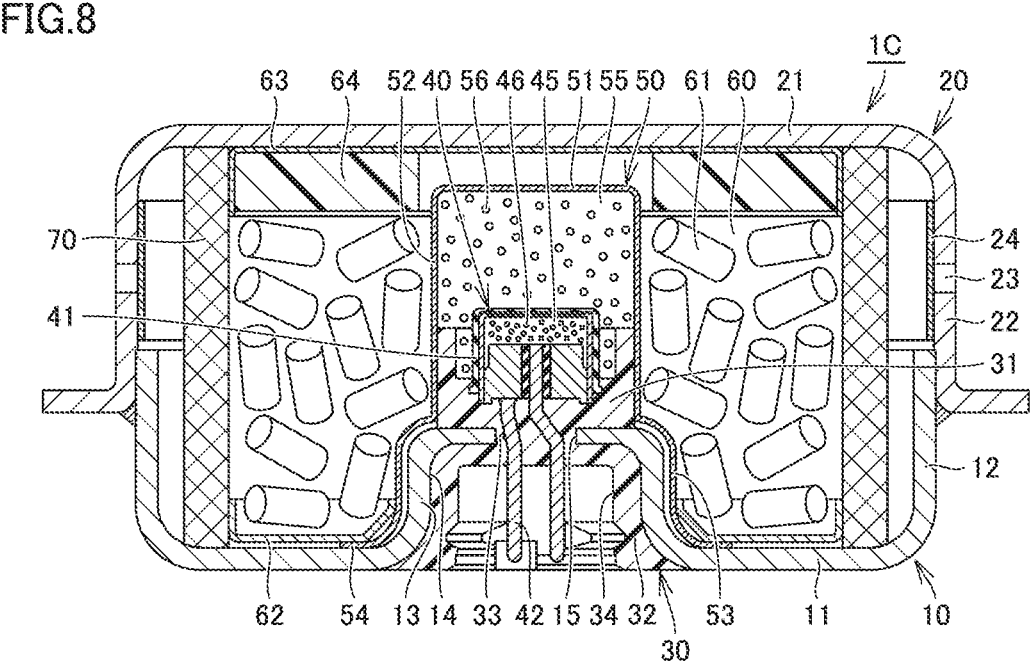
FIG. 8 is a schematic diagram of a gas generator in a second embodiment of the present invention.
Figure 9:
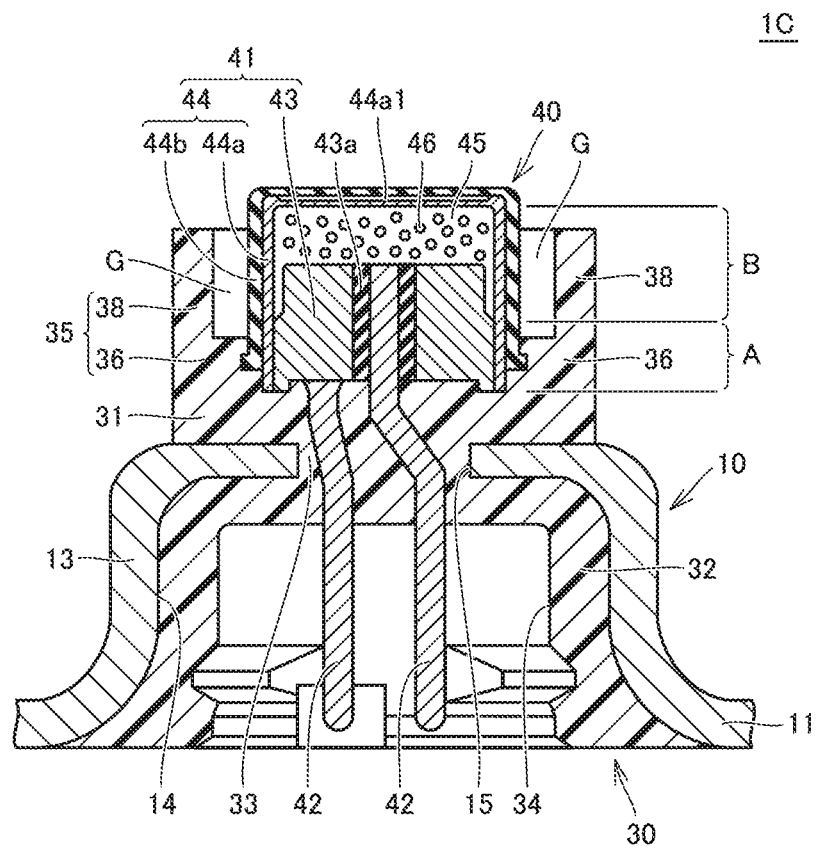
FIG. 9 is an enlarged schematic cross-sectional view showing a structure in the vicinity of the igniter of the gas generator shown in FIG. 8.
Figure 10:
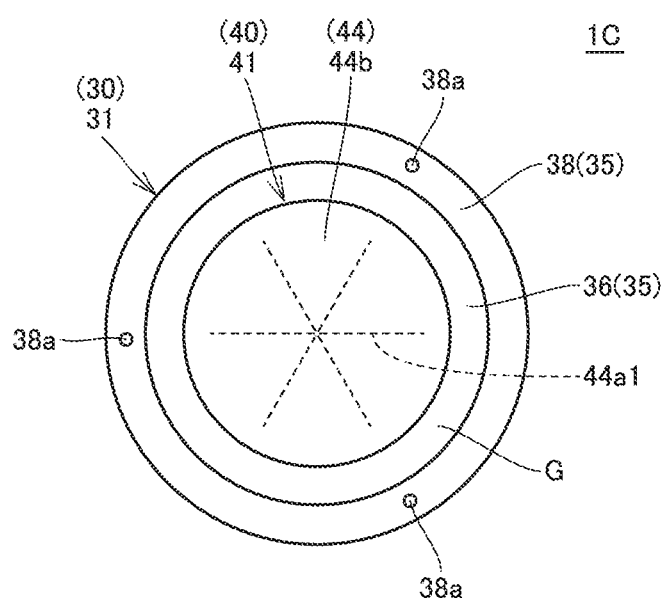
FIG. 10 is a schematic plan view showing the structure in the vicinity of the igniter of the gas generator shown in FIG. 8.

FIG. 8 is a schematic diagram of a gas generator in a second embodiment of the present invention. FIGS. 9 and 10 are an enlarged schematic cross-sectional view and a schematic plan view each showing a structure in the vicinity of the igniter of the gas generator shown in FIG. 8. A construction of a gas generator 1C in the present embodiment will initially be described with reference to FIGS. 8 to 10.

As shown in FIGS. 8 to 10, gas generator 1C in the present embodiment is different from gas generator 1A in the first embodiment described above only in construction of annular wall portion 35 provided in fixing portion 30.

Specifically, as shown in FIGS. 9 and 10, in gas generator 1C in the present embodiment, annular wall portion 35 provided in inner fixing portion 31 of fixing portion 30 formed from a resin molding has lower cover portion 36 located on the side of bottom plate portion 11 and an upper enclosing portion 38 located on the side of top plate portion 21.

Lower cover portion 36 is provided as being continuous in the circumferential direction on the side of bottom plate portion 11 so as to cover the outer circumferential surface of squib cup 44 of ignition portion 41 as being secured thereto. Lower cover portion 36 is in a form of an annular plate without discontinuity along the circumferential direction. A portion of the outer circumferential surface of squib cup 44 on the side of bottom plate portion 11 is completely covered with lower cover portion 36.

Upper enclosing portion 38 is provided as being continuous in the circumferential direction on the side of top plate portion 21 at a distance from the outer circumferential surface of squib cup 44 of ignition portion 41. Though upper enclosing portion 38 is in a form of an annular plate without discontinuity along the circumferential direction, it is not secured to the outer circumferential surface of squib cup 44. A portion of the outer circumferential surface of squib cup 44 on the side of top plate portion 21 is thus exposed and a gap G is provided between upper enclosing portion 38 and squib cup 44. An upper surface of lower cover portion 36 in a portion defining gap G is constructed to substantially be planar.

Lower cover portion 36 is provided to cover a part of contact portion A of squib cup 44 and upper enclosing portion 38 is provided to face a part of non-contact portion B of squib cup 44. Since the boundary between contact portion A and non-contact portion B is arranged on the side of top plate portion 21 relative to a boundary between lower cover portion 36 and upper enclosing portion 38 in the present embodiment, the entire lower cover portion 36 is provided to cover contact portion A, a portion of upper enclosing portion 38 on the side of bottom plate portion 11 is provided to face contact portion A, and a portion of upper enclosing portion 38 on the side of top plate portion 21 is provided to face non-contact portion B.

According to such a construction, generation of an unintended crack leading to a failure in operation of gas generator 1C at fixing portion 30 itself formed from a resin molding or at the interface between fixing portion 30, and lower shell 10 and igniter 40 (in particular, igniter 40) which are members to which the fixing portion is secured, due to an impact generated as a result of activation of igniter 40 during operation of gas generator 1C can be prevented and directivity can be provided to a direction of travel of thermal particles generated in igniter 40. The reason will be described below in detail.

Figure 11:
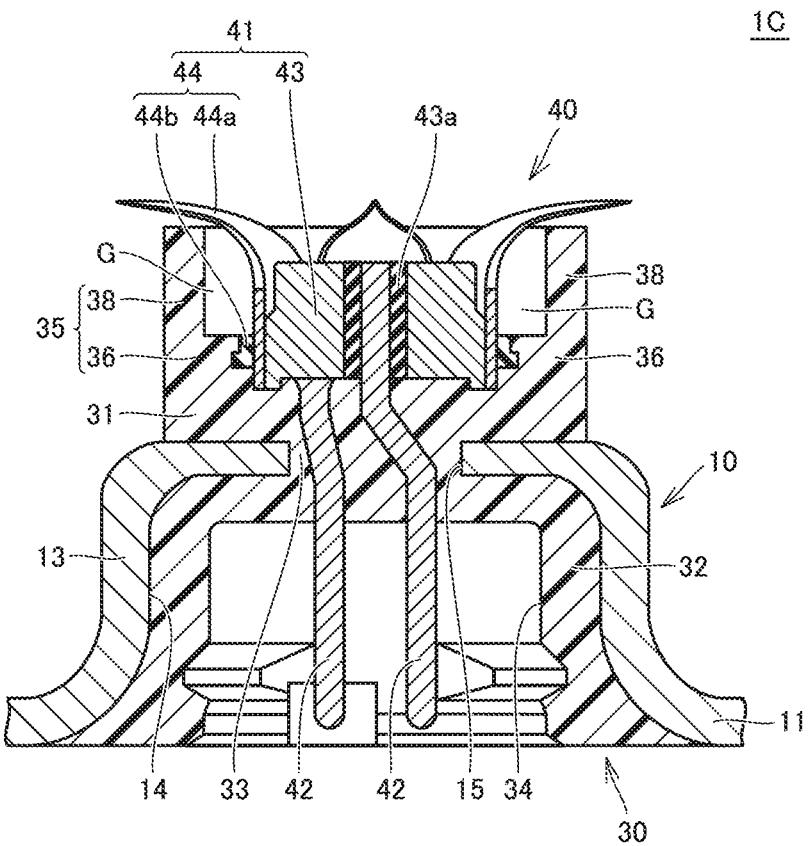
FIG. 11 is a schematic cross-sectional view showing a state in the vicinity of the igniter after operation of the gas generator shown in FIG. 8.

FIG. 11 is a schematic cross-sectional view showing a state in the vicinity of the igniter after operation of the gas generator shown in FIG. 8. When igniter 40 is activated, squib cup 44 bursts from score 44a1 which is a starting point as ignition agent 46 starts burning. Here, since a pressure in ignition chamber 45 has significantly increased, a portion of burst of squib cup 44 widely opens radially outward, and consequently a state after operation of gas generator 1C is as shown in FIG. 11.

Here, since the portion of burst of squib cup 44 deforms as it receives a pressure in ignition chamber 45 described above, a base of deformation is in the vicinity of the boundary between contact portion A and non-contact portion B of squib cup 44. Therefore, squib cup 44 receives a strong impact in its non-contact portion B.

As described above, non-contact portion B of squib cup 44 is surrounded by upper enclosing portion 38 of annular wall portion 35 of fixing portion 30 with gap G being interposed. Therefore, an impact applied to non-contact portion B is applied also to upper enclosing portion 38 as a result of contact of non-contact portion B with upper enclosing portion 38 due to deformation of non-contact portion B. Owing to gap G, however, transmission of the impact is mitigated.

Therefore, by adopting the construction, the impact produced at the time of activation of igniter 40 can be prevented from being transmitted as it is to upper enclosing portion 38 owing to gap G. Thus, no large crack is generated in fixing portion 30 including upper enclosing portion 38.

By adopting the construction, the outer circumferential surface of squib cup 44 is surrounded by upper enclosing portion 38 provided at a prescribed distance. Therefore, the portion of burst of squib cup 44 can be prevented from widely opening radially outward and a direction of travel of thermal particles generated in igniter 40 can be narrowed to a direction toward top plate portion 21. Directivity can thus be provided to the direction of travel of the thermal particles generated in igniter 40.

As set forth above, with gas generator 1C in the present embodiment, directivity can be provided to the direction of travel of the thermal particles generated in igniter 40. Therefore, high gas output can be obtained in an early stage from start of activation and no large crack is generated in fixing portion 30. Occurrence of a failure at the time of operation can thus be prevented.

Gas generator 1C in the present embodiment is constructed such that lower cover portion 36 of annular wall portion 35 is substantially similar in outer diameter to upper enclosing portion 38 and inner fixing portion 31 in a portion except for annular wall portion 35 is substantially similar in outer diameter to lower cover portion 36 and upper enclosing portion 38. The outer circumferential surface of inner fixing portion 31 including annular wall portion 35 is thus provided as a substantially annular circumferential surface.

According to such a construction, a press-fit margin for enhancer cup 50 to be press-fitted to inner fixing portion 31 can be longer along the axial direction of enhancer cup 50 by a dimension of upper enclosing portion 38 than in an example without upper enclosing portion 38. Therefore, strength of assembly of enhancer cup 50 to inner fixing portion 31 can be enhanced. Enhancer cup 50 can thus also effectively be prevented from coming off after enhancer cup 50 is assembled to the subassembly including lower shell 10 and until enhancer cup 50 is further fixed to lower shell 10 (for example, enhancer cup 50 is prevented from coming off when an operation to invert a workpiece described above is performed or when the entire workpiece is tilted during transfer between processes).

In order to more readily and reliably press-fit enhancer cup 50 described above, an outer geometry of a portion of inner fixing portion 31 including annular wall portion 35 to which enhancer cup 50 is to be press-fitted is preferably in a tapered shape slightly tapered toward top plate portion 21. In that case, the outer circumferential surface of inner fixing portion 31 including annular wall portion 35 described above is provided as a conical surface in a strict sense.

From a point of view of increase in strength of assembly of enhancer cup 50 to inner fixing portion 31, a press-fit margin is preferably secured such that the inner circumferential surface of sidewall portion 52 of enhancer cup 50 is brought in press contact not only with the outer circumferential surface of upper enclosing portion 38 and the outer circumferential surface of lower cover portion 36 but also with at least a part of the outer circumferential surface of inner fixing portion 31 in the portion located on the side of bottom plate portion 11 relative to lower cover portion 36.

Figure 12:
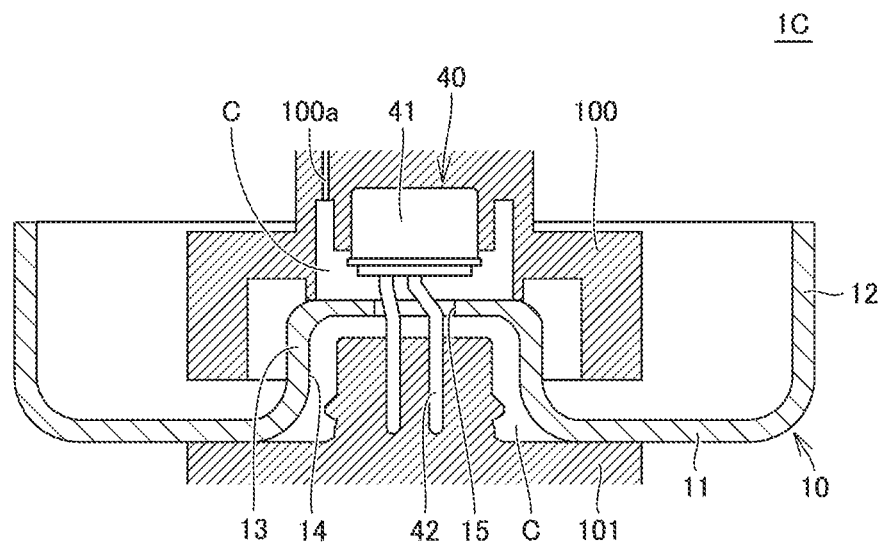
FIG. 12 is a schematic cross-sectional view showing a procedure of manufacturing the fixing portion of the gas generator shown in FIG. 8.

FIG. 12 is a schematic cross-sectional view showing a procedure of manufacturing the fixing portion of the gas generator shown in FIG. 8. As described above, fixing portion 30 is formed from a resin molding formed through injection molding (more specifically, insert molding) with the use of a mold, and in formation of fixing portion 30, upper mold 100 and lower mold 101 for injection molding as shown in FIG. 12 are made use of.

Specifically, initially, upper mold 100 and lower mold 101 are set for lower shell 10 manufactured by press-forming in advance. Lower mold 101 is set prior to setting of upper mold 100, and igniter 40 manufactured in advance is set on lower mold 101 from the inside of lower shell 10 such that terminal pin 42 is inserted into opening 15 provided in protruding cylindrical portion 13 of lower shell 10. Cavity C in a shape corresponding to fixing portion 30 is thus provided in upper mold 100 and lower mold 101.

In this state, a fluid resin material is fed into cavity C through gate 100a for injection of the fluid resin material provided in upper mold 100 and thereafter the fed fluid resin material is solidified so that fixing portion 30 is formed. A space between bottom plate portion 11 of lower shell 10 and igniter 40 is thus filled with fixing portion 30 so that igniter 40 is fixed to lower shell 10. After fixing portion 30 is formed, upper mold 100 and lower mold 101 are removed.

As illustrated, gate 100a is preferably arranged in a surface of upper enclosing portion 38 provided in annular wall portion 35 of fixing portion 30 (more preferably, a plurality of locations in an upper surface located on the side of top plate portion 21 of upper enclosing portion 38 after assembly). According to such a construction, as shown in FIG. 10, a gate mark 38a is provided at a plurality of locations in the surface of upper enclosing portion 38.

According to such a construction, generation of a crack in fixing portion 30 at the time of activation of igniter 40 can further effectively be prevented. This is because, in injection molding, a portion of contact in the inside of cavity C, of the fluid resin material simultaneously fed through a plurality of gates 100a is located in lower cover portion 36 and in upper enclosing portion 38 not in contact with the outer circumferential surface of squib cup 44.

The contact portion is a portion where strength is more likely to be lower than other portions. Therefore, when such a contact portion receives a strong impact at the time of activation of igniter 40, a crack is more likely in that portion. By adopting the construction, however, the contact portion is located in lower cover portion 36 which receives only a relatively weak impact at the time of activation of igniter 40 and in upper enclosing portion 38 which does not receive a strong impact owing to gap G. Therefore, a crack can effectively be prevented from being generated in annular wall portion 35 as a whole including lower cover portion 36 and upper enclosing portion 38.

Second Modification

Figure 13:
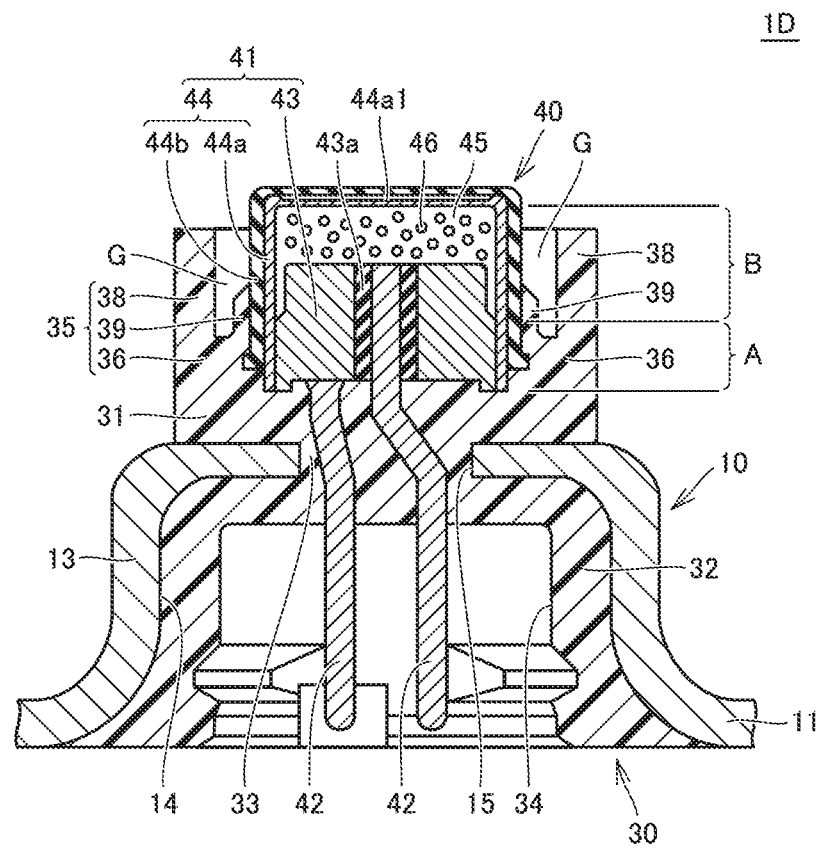
FIG. 13 is an enlarged schematic cross-sectional view showing a structure in the vicinity of the igniter of a gas generator according to a second modification.
Figure 14:
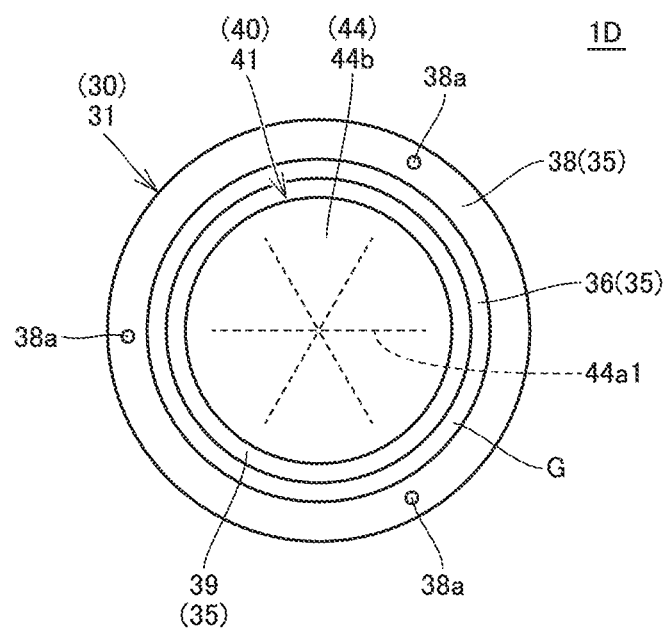
FIG. 14 is a schematic plan view showing the structure in the vicinity of the igniter of the gas generator according to the second modification.

FIGS. 13 and 14 are an enlarged schematic cross-sectional view and a schematic plan view each showing a structure in the vicinity of the igniter of a gas generator according to a second modification based on the present embodiment described above. A gas generator 1D according to the second modification will be described below with reference to FIGS. 13 and 14.

As shown in FIGS. 13 and 14, gas generator 1D according to the second modification is different from gas generator 1C described above in that annular wall portion 35 provided in fixing portion 30 further includes upper auxiliary cover portion 39 in addition to lower cover portion 36 and upper enclosing portion 38.

Specifically, upper auxiliary cover portion 39 is provided in gap G provided between the outer circumferential surface of squib cup 44 and upper enclosing portion 38. Upper auxiliary cover portion 39 is shorter in axial length than upper enclosing portion 38 and a thickness in the radial direction of upper auxiliary cover portion 39 is sufficiently small. Upper auxiliary cover portion 39 is provided to cover a part of non-contact portion B of squib cup 44. The upper surface of lower cover portion 36 in a portion defining gap G is constructed to substantially be planar.

Since upper auxiliary cover portion 39 is sufficiently small in thickness, it is relatively likely to elastically deform. Therefore, the impact produced as a result of activation of igniter 40 at the time of operation of gas generator 1D can be received and absorbed.

Therefore, according to such a construction as well, an effect the same as in gas generator 1C described above is obtained. High gas output can be obtained in an early stage from start of activation and occurrence of a failure at the time of operation can be prevented.

Third Modification

Figure 15:
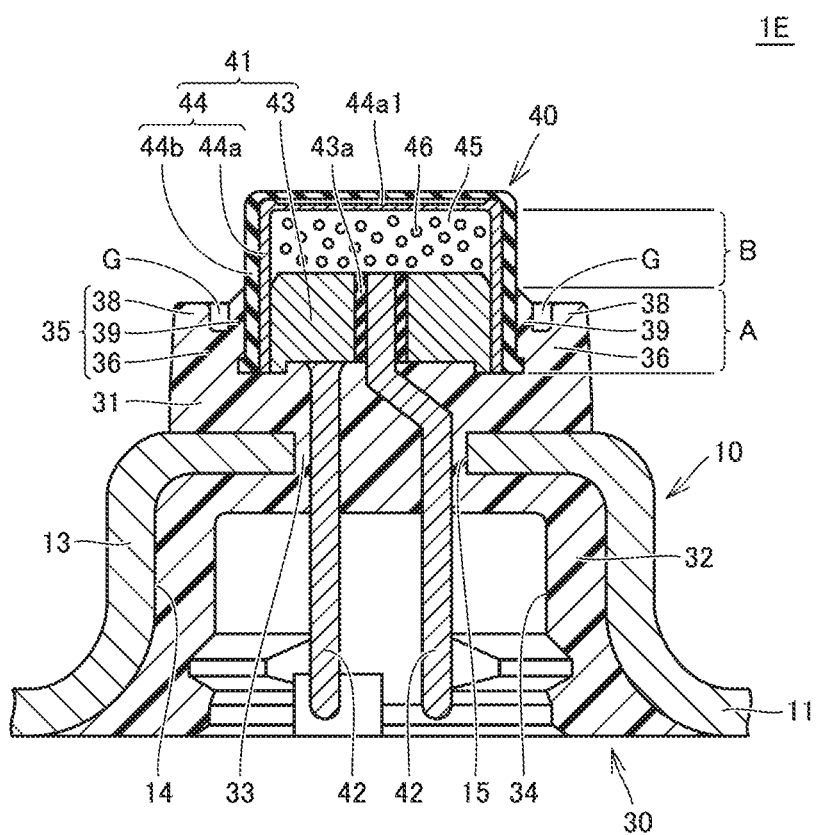
FIG. 15 is an enlarged schematic cross-sectional view showing a structure in the vicinity of the igniter of a gas generator according to a third modification.

FIG. 15 is an enlarged schematic cross-sectional view showing a structure in the vicinity of the igniter of a gas generator according to a third modification based on the present embodiment described above. A gas generator 1E according to the third modification will be described below with reference to FIG. 15.

As shown in FIG. 15, gas generator 1E according to the third modification is different from gas generator 1D described above mainly in construction that upper enclosing portion 38 is small in axial length.

Specifically, upper enclosing portion 38 is shorter in axial length than upper auxiliary cover portion 39 provided in gap G between upper enclosing portion 38 and the outer circumferential surface of squib cup 44. An axial end portion of upper enclosing portion 38 located on the side of top plate portion 21 is thus located on the side of bottom plate portion 11 relative to an axial end portion of upper auxiliary cover portion 39 located on the side of top plate portion 21. An upper surface of lower cover portion 36 in a portion defining gap G is constructed to substantially be planar.

Upper auxiliary cover portion 39 is provided to face substantially only a part of contact portion A of squib cup 44 and upper enclosing portion 38 is also provided to face only a part of contact portion A of squib cup 44.

From a different point of view, annular wall portion 35 constructed as such can also be understood as an annular groove portion being provided at an axial end portion located on the side of top plate portion 21.

Upper auxiliary cover portion 39 is sufficiently small in thickness and more particularly sufficiently smaller in thickness than upper enclosing portion 38 so that it is relatively likely to elastically deform. Therefore, upper auxiliary cover portion 39 can receive and absorb an impact produced as a result of activation of igniter 40 at the time of operation of gas generator 1E and propagation of the impact to lower cover portion 36 and upper enclosing portion 38 can effectively be suppressed. Under the presence of a space where upper auxiliary cover portion 39 is not provided in gap G provided between upper enclosing portion 38 and the outer circumferential surface of squib cup 44 (in other words, the annular groove portion), propagation of the impact produced as a result of activation of igniter 40 can effectively be suppressed.

Since upper enclosing portion 38 is provided in annular wall portion 35, the portion of burst of squib cup 44 can be prevented from widely opening radially outward and a direction of travel of the thermal particles generated in igniter 40 can also be narrowed to a direction toward top plate portion 21, although an obtained effect is less than in the second modification described above due to the shorter axial length thereof.

Therefore, according to such a construction as well, an effect the same as in gas generator 1D described above is obtained. High gas output can be obtained in an early stage from start of activation and occurrence of a failure at the time of operation can be prevented.

Gas generator 1E in the present embodiment is also constructed such that lower cover portion 36 of annular wall portion 35 is substantially similar in outer diameter to upper enclosing portion 38 and inner fixing portion 31 in a portion except for annular wall portion 35 is substantially similar in outer diameter to lower cover portion 36 and upper enclosing portion 38. The outer circumferential surface of inner fixing portion 31 including annular wall portion 35 is thus provided as a substantially annular circumferential surface.

According to such a construction, a press-fit margin for enhancer cup 50 to be press-fitted to inner fixing portion 31 can be longer along the axial direction of enhancer cup 50 by a dimension of upper enclosing portion 38 than in an example without upper enclosing portion 38. Therefore, strength of assembly of enhancer cup 50 to inner fixing portion 31 can be enhanced. Therefore, enhancer cup 50 can also effectively be prevented from coming off after enhancer cup 50 is assembled to the subassembly including lower shell 10 and until enhancer cup 50 is further fixed to lower shell 10 (for example, enhancer cup 50 being prevented from coming off when an operation to invert a workpiece described above is performed or when the entire workpiece is tilted during transfer between processes).

As illustrated, in order to more readily and reliably press-fit enhancer cup 50 described above, an outer geometry of a portion of inner fixing portion 31 including annular wall portion 35 to which enhancer cup 50 is to be press-fitted is preferably in a tapered shape slightly tapered toward top plate portion 21. In that case, the outer circumferential surface of inner fixing portion 31 including annular wall portion 35 described above includes a conical surface in a strict sense.

From a point of view of increase in strength of assembly of enhancer cup 50 to inner fixing portion 31, a press-fit margin is preferably secured such that the inner circumferential surface of sidewall portion 52 of enhancer cup 50 is brought in press contact not only with the outer circumferential surface of upper enclosing portion 38 and the outer circumferential surface of lower cover portion 36 but also with at least a part of the outer circumferential surface of inner fixing portion 31 in the portion located on the side of bottom plate portion 11 relative to lower cover portion 36.

Though an example in which an upper shell and a lower shell are formed from a press-formed product formed by press-working a member made of metal has been described above by way of example in the first and second embodiments and the modifications thereof of the present invention, limitation thereto is not necessarily intended. An upper shell and a lower shell formed by combination of press-working and another type of working (forging, drawing, cutting, or the like) may be employed, or an upper shell and a lower shell formed only by another type of working may be employed.

Though an example in which a protruding cylindrical portion is provided in a lower shell has been described above by way of example in the first and second embodiments and the modifications thereof of the present invention, the present invention can naturally be applied also to a gas generator constructed without a protruding cylindrical portion being provided.

Though an example in which the enhancer cup is press-fitted to the inner fixing portion including the annular wall portion has been described above by way of example in the first and second embodiments and the modifications thereof of the present invention, another member may be press-fitted to the inner fixing portion. For example, a partition member which serves as a partition in the space in the housing or the lower supporting member described above is assumed as the externally attached component described above and such a component may be press-fitted to the inner fixing portion.

Though an example in which the upper cover portion provided in the annular wall portion is divided into three parts in the circumferential direction has been described above by way of example in the first embodiment and the modification thereof of the present invention, the number of division is not limited as such. A specific shape of various components such as a housing, an igniter, a fixing portion, and an enhancer cup exemplified in the first and second embodiments and the modifications thereof of the present invention described above can also be modified as appropriate without departing from the gist of the present invention.

Though an example in which the present invention is applied to a disc type gas generator has been described above by way of example in the first and second embodiments and the modifications thereof of the present invention, applications of the present invention are not limited thereto but the present invention can naturally be applied also to other types of gas generators such as a cylinder type gas generator. When the present invention is applied to the cylinder type gas generator, a partition member which serves as a partition in the space in the housing or the housing itself in addition to the enhancer cup is assumed as the externally attached component described above.

Thus, the embodiments and the modifications thereof disclosed herein are illustrative and non-restrictive in every respect. The technical scope of the present invention is delimited by the terms of the claims, and includes any modifications within the scope and meaning equivalent to the terms of the claims.

REFERENCE SIGNS LIST 1A to 1E gas generator; 10 lower shell; 11 bottom plate portion; 12 circumferential wall portion; 13 protruding cylindrical portion; 14 depression portion; 15 opening; 20 upper shell; 21 top plate portion; 22 circumferential wall portion; 23 gas discharge opening; 24 sealing tape; 30 fixing portion; 31 inner fixing portion; 32 outer fixing portion; 33 coupling portion; 34 female connector portion; 35 annular wall portion; 36 lower cover portion; 37 upper cover portion; 37a gate mark; 38 upper enclosing portion; 38a gate mark; 39 upper auxiliary cover portion; 40 igniter; 41 ignition portion; 42 terminal pin; 43 plug; 43a joint portion; 44 squib cup; 44a inner cup; 44a1 score; 44b outer cup; 45 ignition chamber; 46 ignition agent; 50 enhancer cup; 51 top wall portion; 52 sidewall portion; 53 extension portion; 54 tip end portion; 55 enhancer chamber; 56 enhancer agent; 60 combustion chamber; 61 gas generating agent; 62 lower supporting member; 63 upper supporting member; 64 cushion; 70 filter; 100 upper mold; 100a gate; 101 lower mold; A contact portion; B non-contact portion; C cavity; and G gap

The invention claimed is:

1. A gas generator, comprising:
a cylindrical housing including a top plate portion and a bottom plate portion closing axial end portions and a circumferential wall portion provided with a gas discharge opening and containing a combustion chamber accommodating a gas generating agent;
an igniter charged with an ignition agent for burning the gas generating agent;
a fixing portion fixing the igniter to the bottom plate portion,
the bottom plate portion being provided with an opening,
the igniter including an ignition portion defining an ignition chamber accommodating the ignition agent and a terminal pin connected to the ignition portion for igniting the ignition agent and arranged to pass through the opening,
the fixing portion being formed from a resin molding provided to close the opening and to fill a space between the igniter and the bottom plate portion,
the resin molding including an annular wall portion surrounding an outer circumferential surface of the ignition portion, and
the annular wall portion having a lower cover portion provided, which is continuous in a circumferential direction on a side of the bottom plate portion so as to cover the outer circumferential surface of the ignition portion and which is secured to the outer circumferential surface of the ignition portion, and an upper enclosing portion provided on a side of the top plate portion at a distance from the outer circumferential surface of the ignition portion; and
an externally attached component externally attached to the annular wall portion,
wherein an inner circumferential surface of the externally attached component and an outer circumferential surface of the annular wall portion are in press contact with each other,
wherein the externally attached component is a cup-shaped member, which accommodates an enhancer agent arranged to face the ignition portion,
wherein the cup-shaped member is made from a member low in mechanical strength that bursts or melts as the enhancer agent burns,
wherein the annular wall portion is tapered toward the top plate portion, and
wherein the inner circumferential surface of the cup-shaped member covers and is in press contact with all of the outer circumferential surface of the annular wall portion at the upper enclosing portion of the annular wall portion.

2. The gas generator according to claim 1, wherein
the ignition portion has a substantially cylindrical cup body having a closed upper end and an open lower end and a plug closing the lower end of the cup body and supporting the terminal pin,
the cup body includes a contact portion located on the side of the bottom plate portion and in contact with the plug and a non-contact portion located on the side of the top plate portion and facing the ignition chamber without being in contact with the plug, and
the lower cover portion covers at least a part of the contact portion and the upper enclosing portion faces at least a part of the non-contact portion.

3. The gas generator according to claim 1, wherein
the annular wall portion further has an upper auxiliary cover portion provided, which is continuous in the circumferential direction on the side of the top plate portion so as to be located in a gap provided between the outer circumferential surface of the ignition portion and the upper enclosing portion and so as to cover the outer circumferential surface of the ignition portion, which is secured to the outer circumferential surface of the ignition portion.

4. The gas generator according to claim 1, wherein
a gate mark is provided in a surface of the upper enclosing portion.

5. A gas generator, comprising:
a cylindrical housing including a top plate portion and a bottom plate portion closing axial end portions and a circumferential wall portion provided with a gas discharge opening and containing a combustion chamber accommodating a gas generating agent;
an igniter charged with an ignition agent for burning the gas generating agent; and
a fixing portion fixing the igniter to the bottom plate portion, the bottom plate portion being provided with an opening, the igniter including an ignition portion defining an ignition chamber accommodating the ignition agent and a terminal pin connected to the ignition portion for igniting the ignition agent and arranged to pass through the opening, the fixing portion being formed from a resin molding provided to close the opening and to fill a space between the igniter and the bottom plate portion, the resin molding including an annular wall portion surrounding an outer circumferential surface of the ignition portion, and the annular wall portion having a lower cover portion provided, which is continuous in a circumferential direction on a side of the bottom plate portion so as to cover the outer circumferential surface of the ignition portion, which is secured to the outer circumferential surface of the ignition portion and an upper cover portion provided, which is intermittent in the circumferential direction on a side of the top plate portion so as to cover the outer circumferential surface of the ignition portion, which is secured to the outer circumferential surface of the ignition portion.

6. The gas generator according to claim 5, wherein the ignition portion has a substantially cylindrical cup body having a closed upper end and an open lower end and a plug closing the lower end of the cup body and supporting the terminal pin, the cup body includes a contact portion located on the side of the bottom plate portion and in contact with the plug and a non-contact portion located on the side of the top plate portion and facing the ignition chamber without being in contact with the plug, and the lower cover portion covers at least a part of the contact portion and the upper cover portion covers at least a part of the non-contact portion.

7. The gas generator according to claim 5, wherein the annular wall portion further has an upper auxiliary cover portion provided, which is intermittent in the circumferential direction on the side of the top plate portion so as to be located between the upper cover portion divided in the circumferential direction and so as to cover the outer circumferential surface of the ignition portion, which is secured to the outer circumferential surface of the ignition portion, and the upper auxiliary cover portion is smaller in thickness in a radial direction than the upper cover portion.

8. The gas generator according to claim 5, wherein a gate mark is provided in a surface of the upper cover portion.

9. The gas generator according to claim 5, further comprising an externally attached component externally attached to the annular wall portion, wherein an inner circumferential surface of the externally attached component and an outer circumferential surface of the annular wall portion are in press contact with each other.

10. The gas generator according to claim 9, wherein the externally attached component is a cup-shaped member which accommodates an enhancer agent arranged to face the ignition portion.

\* \* \* \* \*